United States Patent [19]

Kuroyama et al.

[11] 4,321,979
[45] Mar. 30, 1982

[54] PASSIVE SEATBELT SYSTEM

[75] Inventors: Toshinobu Kuroyama; Hisatoshi Ohta, both of Aichi, Japan

[73] Assignee: Toyota Jidosha Kogyo Kabushiki Kaisha, Toyota, Japan

[21] Appl. No.: 136,117

[22] Filed: Mar. 27, 1980

[30] Foreign Application Priority Data

Mar. 30, 1979 [JP] Japan .................................. 54-39130

[51] Int. Cl.³ .............................................. B60R 21/02
[52] U.S. Cl. .................................. 180/268; 280/804; 318/484
[58] Field of Search ...................... 180/268, 269, 270; 280/802, 804, 807, 808; 307/10 SB, 141, 141.4, 140, 293; 340/52 E; 318/484; 200/61.58 B

[56] References Cited

U.S. PATENT DOCUMENTS

| | | | |
|---|---|---|---|
| 3,986,093 | 10/1976 | Wakamatsu et al. | 318/484 |
| 4,110,673 | 8/1978 | Nagy et al. | 318/484 |
| 4,175,633 | 11/1979 | Andres et al. | 180/270 |

*Primary Examiner*—Joseph F. Peters, Jr.
*Assistant Examiner*—Randall A. Schrecengost
*Attorney, Agent, or Firm*—Cushman, Darby & Cushman

[57] ABSTRACT

A seatbelt system for restraining and protecting an occupant in an emergency of a vehicle, and more particularly to improvements in a fully passive type seatbelt system wherein a motor for driving the webbing is automatically actuated in accordance with the actions of an occupant entering or leaving the vehicle so as to fasten the webbing to the occupant or release the webbing from the occupant. When a closed door condition is detected by a door switch for detecting the opened or closed door condition, the motor is actuated to fasten the webbing to the occupant. When an opened door condition is detected by the door switch, the motor is actuated to release the webbing from the occupant. When limit switches detect the movement of the webbing to a normal fastened position or a normal released position are not actuated within a given period of time during which the webbing is being driven by the motor, the driving of the webbing by the motor is brought to a stop. A manual switch is provided for such situations, and when actuated is effective to override the stopped-condition of the motor. When (1) the webbing is not in a normal fastened position and the door switch detects that the door is closed, (2) when a manually operated spool release switch releases the webbing from the occupant, or (3) when any combination of the aforementioned occurs, a warning device is actuated.

13 Claims, 4 Drawing Figures

PASSIVE SEATBELT SYSTEM

BACKGROUND OF THE INVENTION

1. Field of the Invention

The present invention relates to a seatbelt system for restraining and protecting an occupant of a vehicle in an emergency, and more particularly to improvements in a fully passive type seatbelt system wherein means for driving the webbing is automatically actuated in accordance with the actions of the occupant in entering or leaving the vehicle so as to fasten the webbing to the occupant or release the webbing from the occupant.

2. Description of the Prior Art

To secure the safety of the occupant in a collision accident to the vehicle, there have heretofore been used seatbelt systems. To further improve the safety of the occupant, there have been proposed the so-called full-passive type seatbelt systems capable of automatically fastening the webbing for restraining the occupant or releasing the webbing in accordance with the actions of the occupant in entering or leaving the vehicle.

In said full-passive type seatbelt system, the webbing for restraining the occupant is secured at one end thereof to the side surface of a seat for the occupant on the side opposite the door and at the other end thereof to the door. The portion of the webbing mounted on the door is moved by driving means such as a motor in the longitudinal direction of the vehicle, whereby a space formed between the webbing and the seat for the occupant is expanded or contracted, so that the space for the occupant to enter or leave the vehicle can be obtained when the occupant enters and leaves the vehicle, and the webbing can be reliably fastened to the occupant after the occupant has entered the vehicle. Additionally, a switch for detecting the conditions of the door being open or closed is provided in an electric circuit of said motor. In the case of the door being closed, the webbing is moved toward the rear of the vehicle, i.e. in the direction of the seat to have the occupant fastened thereto with the webbing, and, in the case of the door being open, the webbing is moved toward the front of the vehicle to form a space sufficient for the occupant to enter and leave the vehicle between the webbing and the seat for the occupant.

FIG. 1 shows one example of the full-passive type seatbelt system which have been proposed heretofore. In the drawing, designated at 10 is a vehicle body, 12 a seat for an occupant being disposed on the floor of said vehicle body 10, a webbing retractor 14 solidly secured to the side surface of said seat 12 on the side nearest the center of the vehicle, a guide rail 16 provided on the roof side member of the vehicle body 10, a slide plate 18 slidable along said guide rail 16 in the longitudinal direction of the vehicle, a webbing 20, the inner end 20a of which is wound up into said retractor 14 by its biasing force and the outer end 20b of which is engaged with said slide plate 18, a retractor 22 solidly secured to the roof side member of the vehicle for constantly biasing said slide plate 18 toward the rear of the vehicle through a narrow width webbing 24, and driving means 26 for moving said slide plate 18 in the longitudinal direction of the vehicle by winding up one end of a wire 28, the other end of which is fixed on said slide plate 18. Here, the driving means 26 is adapted to be operated on detecting the action of the occupant leaving the vehicle. For instance, if the occupant opens the door for entering or leaving the vehicle, said driving means is operated by an opened door detecting signal emitted then. Furthermore, said driving means 26 is adapted to deliver the wire 28 by an action of the occupant being seated, e.g. by closing the door after he is seated. With the abovedescribed full-passive type seatbelt system, in the case of the door being closed, the webbing is moved toward the rear of the vehicle, i.e. in the direction of the occupant's seat, whereby the webbing is fastened to the occupant, and, in the case of the door being open, the webbing is moved toward the front of the vehicle, whereby a space sufficient for the occupant to enter or leave the vehicle is formed between the webbing and the seat for the occupant.

In the conventional fully passive type seatbelt system the webbing for restraining the occupant is automatically fastened to the occupant and released therefrom in accordance with the actions of the occupant in entering or leaving the vehicle, thus securing high safety for the occupant. However, with those conventional fully passive seatbelt systems, there have been encountered certain disadvantages. The control circuit for actuating the webbing driving means is very complicated and, nevertheless, in case the occupant has entered the vehicle and has fastened thereto the webbing, and thereafter, he is released electrically or mechanically from the restraint of the webbing, he has neither effective alternative measure for safety nor warning means.

SUMMARY OF THE INVENTION

One object of the present invention is to obviate the abovedescribed disadvantages of the prior art and provide a passive seatbelt system having a simple control circuit, wherein the webbing can be fastened to the occupant or released therefrom in very natural manner in accordance with the actions of the occupant getting on or off the vehicle.

Another object of the present invention is to provide said passive seatbelt system with a reliable warning, so that the safety of the occupant can be secured.

According to the present invention, a passive seatbelt system comprises:

webbing driving means for driving a webbing;

door condition detecting means for detecting the opened or closed door condition;

fastening detecting means for detecting the movement of the webbing to a normal fastened position;

release detecting means for detecting the movement of the webbing to a normal released position; and a control circuit having relay coils and a timer, said relay coils being connected to said door condition detecting means and said fastening detecting means or said release detecting means, said timer being connected to said relay coils; wherein said webbing driving means is actuated to fasten the webbing to the occupant when the closed door condition is detected by said door condition detecting means, actuated to release the webbing from the occupant when the opened door condition is detected by said door condition detecting means, and stopped when fastening detecting means for detecting the movement of the webbing to a normal fastened position or release detecting means for detecting the movement of the webbing to a normal released position does not operated even if the webbing is driven by said webbing driving means for a given period of time.

Further, the system comprises a manual operation switch to release the stopped condition of said webbing driving means by said timer of the control circuit, whereby only if the manual operation switch is manually operated, the webbing fastening progress or webbing releasing progress is stopped.

Furthermore, said manual operation switch is given a function of forcedly grounding an output from said timer of the control circuit in which a voltage is increased with the passage of time for driving the webbing.

Further, the system comprises a warning means which is actuated when said manual operation switch is operated by the occupant, when said fastening detecting means is not in operation, and when an unrestrained webbing detecting means for detecting that the restraint by the webbing is manually released is in operation.

Further, said door condition detecting means comprises a door switch for detecting the condition of the door being opened or closed, the same door switch being for turning on or off a room lamp of the vehicle as associated with the opening and closing operation of the door, so that a separate means for detecting the opened or closed door condition can be dispensed with.

Additionally, said fastening detecting means and said release detecting means are limit switches to act in accordance with the value of movement of the webbing.

In addition, said warning means is comprised of a warning lamp and a warning buzzer, so that warning can be informed to the occupant without fail.

Further, said unrestraining webbing detecting means is a spool release switch actuated when the condition of restraint exerted by a winding spool provided on a retractor of the webbing is manually released.

BRIEF DESCRIPTION OF THE DRAWINGS

The above-mentioned features and objects of the present invention will become more apparent by reference to the following description taken in conjunction with the accompanying drawings, wherein like reference numerals denote like elements, and in which.

DETAILED DESCRIPTION OF THE INVENTION

Figure 2:
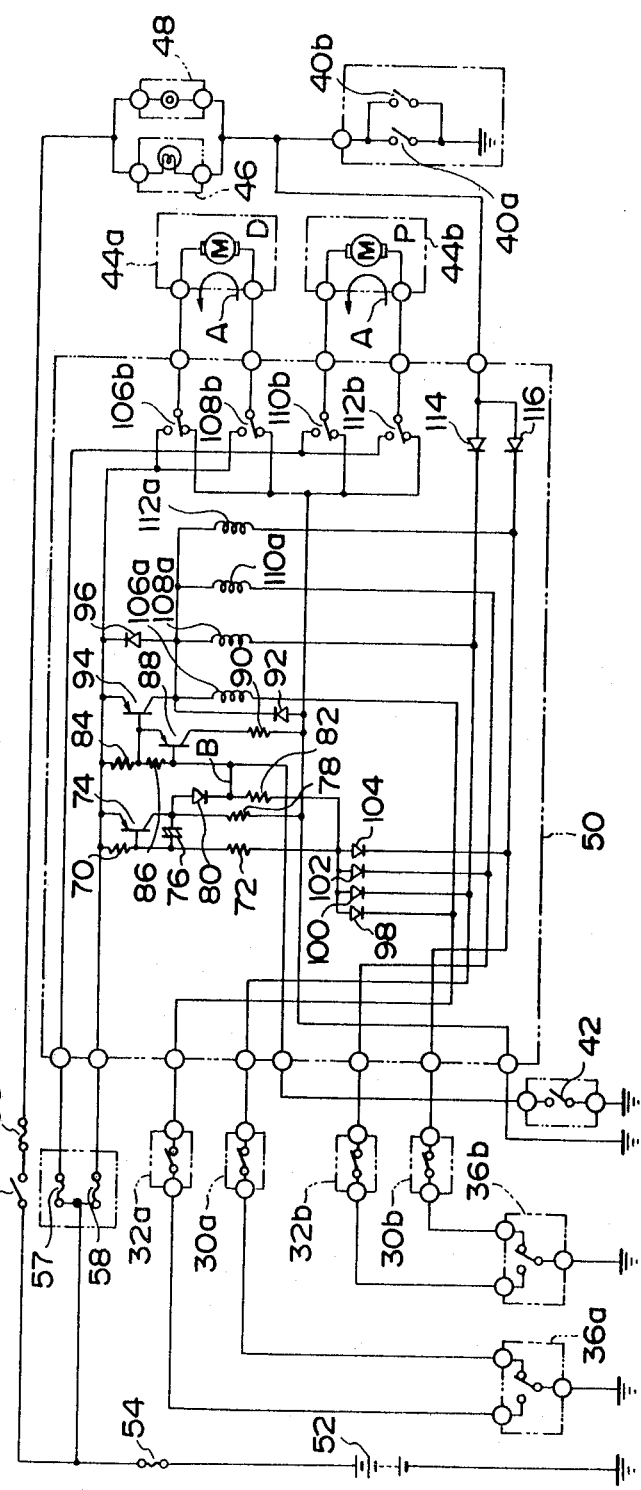
FIG. 2 is a circuit diagram showing the arrangement of one embodiment of the passive seatbelt system according to the present invention.

Detailed description will hereunder be given of one embodiment of the present invention with reference to the drawings. As shown in FIG. 2, this embodiment comprises: a limit switch 30a for detecting when the webbing on the side of the operator's seat is in the fastened position and operating; a limit switch 32a for detecting when the webbing on the driver's side is in the released position and operating; a door switch 36a for sending out a door opened signal or a door closed signal in accordance with the condition of the door on the side of the driver's seat; a spool release switch 40a provided on the retractor for the webbing on the side of the driver's seat for operating when the webbing restrained by the winding spool is manually released; a limit switch 30b for detecting when the webbing on the side of passenger's seat is in the fastened position and operating; a limit switch 32b for detecting when the webbing on the side of the passenger's seat is in the released position and operating; a door switch 36b operationally associated with the condition of the door on the side of the passenger's seat and operative when the door is opened or closed for sending out an opened door signal or a closed door signal; a spool release switch 40b provided on the retractor for the webbing on the side of the passenger's seat for operating when the webbing normally restrained by the webbing spool is manually released; a manual operation switch 42 for manually overriding the stop of driving of the webbing; a motor 44a reversibly rotatable for driving the webbing on the side of the driver's seat; a motor 44b reversibly rotatable for driving the webbing on the side of the passenger's seat; a warning lamp 46 provided in the instrument panel of the driver's seat for giving a warning to an occupant; a warning buzzer 48 connected in parallel to said warning lamp 46 for also giving a warning to the occupant; and a control circuit 50 for controlling said motors 44a, 44b, warning lamp 46 and warning buzzer 48 in response to output signals from the respective detecting means.

In the drawing, designated at 52 is a battery, 54, 56, 57, 58 fuses, and 60 an ignition switch.

Figure 1:
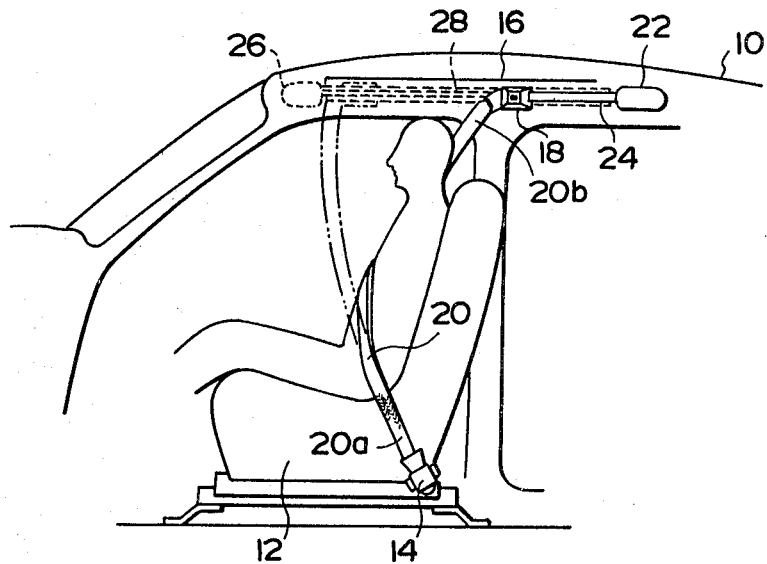
FIG. 1 is a side view showing the vehicle occupant's seat provided thereon with the full-passive type seatbelt system.

Said both limit switches 30a, 30b may be provided at a portion adjacent the rear end of the guide rail 16 as shown in FIG. 1 for example, and are adapted to be turned off (opened) when the slide plate 18 reaches a position adjacent the rear end of the guide rail 16, i.e., the webbing 20 is fastened to the occupant.

Furthermore, said both limit switches 32a, 32b may be provided at a portion adjacent the forward end of the guide rail 16 as shown in FIG. 1 for example, and are adapted to be turned off when the slide plate 18 reaches a position adjacent the forward end of the guide rail 16, i.e., the webbing 20 is released from the occupant.

Said door switches 36a, 36b are provided on the doors on the side of drivers's seat and passenger's seat, respectively, and are adapted to ground their contacts at the right in FIG. 2 when the door is closed and to ground their contacts at the left in FIG. 2 when the door is opened.

Figure 3:
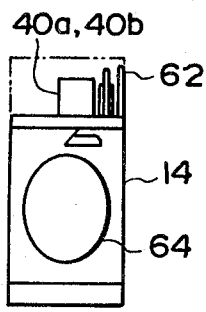
FIGS. 3 and 4 are a front and a side views showing the spool release switch used in said embodiment.
Figure 4:
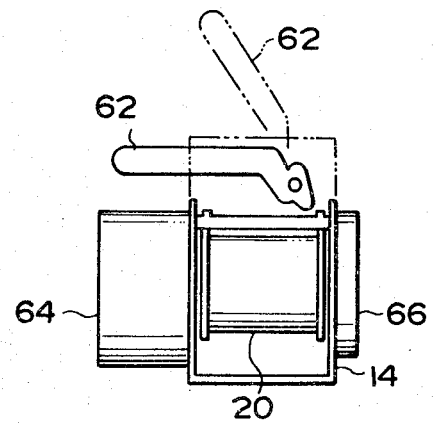

As shown in FIGS. 3 and 4, said spool release switches 40a, 40b are provided on the retractor 14 provided at the side surface of the occupant's seat on the center side of the cabin, and adapted to supply a grounding signal to the control circuit 50 when the restraint of the webbing 20 is released by a release lever 62. In FIGS. 3 and 4, designated at 64 is an inertia lock sensor for locking the retractor 14 in an emergency of the vehicle, and 66 a spiral spring for winding up the webbing 20 during normal running condition of the vehicle.

Said manual operation switch 42 is to be operated by the occupant when the webbing is caught during the progress of fastening or releasing, i.e., the fastened or released position cannot be reached by a normal driving operation, and adapted to supply a grounding signal to the control circuit 50 when operated by the occupant.

As shown in FIG. 2, said control circuit 50 comprises: resistors 70, 72, 78, 82, 84, 86 and 90; transistors 74, 88 and 94; a capacitor 76; diodes 80, 92 96, 98, 100, 102 and 104; relay coils 106a, 108a, 110a and 112a; relay contacts 106b, 108b, 110b and 112b, which are operated by said relay coils, respectively; and diodes 114 and 116. When the occupants of the vehicle, i.e., the driver and other general occupants get into the vehicle and close the doors, said door switches, 36a, 36b have their contacts grounded (at the right in FIG. 2). Immediately after the occupants of the vehicle have entered the vehicle, the webbing normally will not be fastened to the occupants, whereby the limit switches 30a, 30b for detecting the fastened position are "ON". Consequently, the transistors 88, 94 (Darlington-connected to each other) become "ON", whereby an electric current, which is fed from the battery 52 through fuses 54, 58 to the control circuit 50, flows through the relay coils 108a and 112a. Then, the relay contacts 108b and 112b are excited and both relay contacts 106b and 110b are held in non-excitation, whereby respective electric currents fed to the control circuit 50 through the fuse 57 and 58 flow through the relay contact 108b and 112b, are fed to the motor 44a and 44b as indicated by arrows A in the drawing, and flow through the relay contact 106b and 110b of the control circuit 50 to ground. Consequently, the both motors 44a, 44b are rotated in the direction of fastening the webbing. When the respective webbings driven by the motor 44a and 44b reach the normal fastened position within a given period of time, the limit switch 30a and 30b for detecting the fastened position become "OFF", whereby the excitation of the relay coil 108a and 112a is released, and the relay contacts 108b and 112b return to non-excitation. Then, the electric current, which has been flowing through the motors 44a and 44b is cut off, whereby the driving of the respective webbings is brought to a stop.

In this progress of the movement of the webbing, when the webbing is caught in the progress of fastening, i.e., the fastened position cannot be reached, if the supply of an electric current to the motors 44a, 44b is continued, the motors may burn out. Consequently, when the motors 44a, 44b are continuously rotated for a given period of time after the electric current is fed to the motors 44a, 44b, for example more than 15 sec (which is sufficient for the moving from the fastened condition to the released condition or from the released condition to the fastened condition during normal running condition of the vehicle), electric power supplied from a power source to the motors 44a, 44b is forcedly cut off for protecting the motors. Namely, when the door switch 36a or 36b is brought into the closed door condition and the transistors 88, 94 are turned "ON", the relay coil 108a and 112a become excited and the capacitor 76 starts to charge through the transistor 74, whereby the voltage at a point B at the output end of the diode 80 begins to rise. Upon the elapse of a given time after the supply of electric current is begun, this voltage rises to a preset value, and despite the closed door condition which is detected by the door switch 36a or 36b, the transistors 88, 94 are turned "OFF". Then, the supply of electric current to the relay coils 108a, 112a is cut off, whereby the relay contacts 108b, 112b are brought into nonexcitation, so that the supply of electric current to the motors 44a, 44b is cut off. Consequently, in the case the webbing is caught half way or the like, the motors 44a, 44b do not continue to rotate unnecessarily and said motors can be prevented from being burnt out. Since, under the abovedescribed condition, operation cannot be started even if the webbing is unlocked, the manual operation switch 42 is provided. More specifically, when the occupant, after unlocking the webbing, forcibly grounds the voltage at the point B by use of the manual operation switch 42, both the transistors 88, 94 are turned "ON", whereby the supply of electric current to the relay coils 108a, 112a is started again to excite same, so that the supply of electric current to the motors 44a, 44b can be started again to drive the webbing to the normal fastened position.

Since it does not necessarily suffice only to automatically fasten the webbing as described above, in this embodiment when the webbing has not moved to the normal fastened position or the spool release switches 40a, 40b have been turned "ON" out of necessity for the occupant to leave the vehicle in an emergency of the vehicle and the retractor is not in operation, if the ignition switch 60 is turned "ON", the warning lamp 46 is lighted and the warning buzzer 48 is sounded, so that the driver or occupant can be warned.

In addition, all of the above descriptions are given of the case where the webbing is moved from the released condition to the fastened condition, which is substantially similar to the case where the webbing is moved from the fastened condition to the released condition, and hence, description of the latter case is omitted.

In this embodiment the voltage at the point B of the control circuit 50 is forcibly grounded by use of the manual operation switch 42, whereby, not by changing the direction of rotation of the motors 44a, 44b, but, only by operating said manual operation switch 42, the webbing fastening progress or webbing releasing progress can be automatically started again. Furthermore, the position where the manual operation switch is provided is not limited to the abovedescribed one. For example, the moving direction of the webbing can be controlled by use of manual operation switches through connecting said switches in parallel to the relay coils.

Additionally in the abovedescribed embodiment, the means for detecting the opened or closed door is constituted by the door switches, the fastening detecting means is constituted by the limit switches operating in accordance with the movement of the webbing, the unrestrained webbing detecting means is constituted by the spool release switches provided on the retractor for the webbing and operating when the restraint of webbing restrained by the winding spool is manually released, and the warning means is constituted by the warning lamp and warning buzzer. However, it should be understood that these means are not necessarily limited to the above.

From the foregoing description, it should be apparent to one skilled in the art that the above-described embodiment is but one of many possible specific embodiments which can represent the applications of the principles of the present invention. Numerous and varid other arrangements can be readily devised by those skilled in the art without departing from the spirit and scope of the invention.

What is claimed is:

1. A control circuit for a passive seatbelt system of a vehicle, said passive seatbelt system including at least one webbing, each webbing being associated with an occupant of said vehicle, for restraining said occupant in an emergency situation; a webbing drive motor associated with each webbing for moving the associated webbing into one of two positions, said positions being a fastened position and a released position; and a switching system for indicating which one of a plurality of situations characterizes each of said at least one webbing, said situations being (1) secured in said fastened position, (2) secured in said released position, (3) movement required toward said fastened position, and (4) movement required toward said released position; said control circuit comprising:

a current switching circuit;

a biasing circuit coupled to said current switching circuit and responsive to said switching system for turning ON said current switching circuit when either of said situations (3) and (4) occur in the characterization of any of said at least one webbing, and for turning OFF said current switching circuit when neither of said situations (3) and (4) occur in the characterization of all of said at least one webbing;

a relay circuit having respective portions coupled to each drive motor, each respective portion being responsive to said switching system, when said current switching circuit is in an ON condition, for supplying current in one direction to the associated drive motor in response to said situation (3); for supplying current in another direction to the associated drive motor in response to said situation (4); and removing current from the associated drive motor in response to said situations (1) and (2), said relay circuit comprising at least one pair of relay coils, each of said coils having one end thereof connected to one another and to an output of said current switching circuit, and having the other end thereof connected to respective outputs of said switching system, and at least one pair of relay actuated switches, each associated with a respective relay coil and responsive to excitation thereof for switching an associated terminal from ground to a current source, wherein the respective terminals of each of said at least one pair of relay actuated switches are connected to respective terminals of an associated drive motor for controlling the application of current thereto; and an alert circuit including a warning device and at least one release indicating switch, each being associated with one webbing; said alert circuit being responsive, when a propulsion system of said vehicle is actuated, to one or more occurrences, said occurrences including the manual release of the restraining function of said webbing as indicated by any of said at least one release indicating switch and the presence of said situation (3), for indicating a failure of the restraining function of a webbing.

2. The control circuit of claim 1 further comprising a timing circuit coupled to said current switching circuit and effective when said current switching circuit is ON for a predetermined period of time for turning OFF said current switching circuit to prevent the at least one drive motor from burning out.

3. The control circuit of claim 2 further comprising a manual switch for forcibly turning ON said current switching circuit, thereby overriding the OFF condition induced by said timing circuit.

4. A passive seatbelt system comprising:
driving means for driving a webbing;
first detecting means for detecting an opened or closed door condition;
second detecting means for detecting movement of said webbing to a normal fastened position;
third detecting means for detecting movement of said webbing to a normal released position;
a manual switch; and
a control circuit having relay coils and a timer, said relay coils being connected to said first detecting means, said second detecting means and said third detecting means, and said timer being connected to said relay coils and said manual switch, said control circuit including means for actuating said driving means to fasten said webbing to an occupant when a closed door condition is detected by said first detecting means, to release said webbing from said occupant when an opened door condition is detected by said first detecting means, for deactuating said driving means when one of said second detecting means and said third detecting means does not detect said webbing in one of said positions within a predetermined time determined by said timer while said webbing is being driven by said driving means, and for reactuating said driving means in response to operation of said manual switch after said deactuation.

5. A passive seatbelt system as set forth in claim 4 further comprising:
a spool release means for releasing said webbing from said occupant by manual operation; and
a warning means actuated in response to: (1) operation of said spool release means, (2) a closed door condition detected by said first detecting means while said second detecting means does not detect said fastened position, and (3) any combination of the aforementioned conditions.

6. A passive seatbelt system as set forth in claim 5, wherein said warning means comprises a warning lamp and a warning buzzer.

7. A passive seatbelt system as set forth in claim 4, wherein said first detecting means comprises respective door switches for detecting the condition of the respective doors being open or closed, said door switches also being effective for turning on or off a room lamp of the vehicle in accordance with the opening and closing operation of the respective doors.

8. A passive seatbelt system as set forth in claim 4, wherein said first detecting means and said second detecting means are limit switches actuated when said driving means drives said webbing to predetermined positions.

9. A control circuit for a passive seatbelt system or a vehicle, comprising:
first switching means for controlling the switching of current to at least one associated webbing drive motor, said first switching means being effective to controllably establish one of a plurality of conditions, said conditions including (1) operation of said drive motor in one direction to move an associated webbing to a normal fastened position, (2) operation of said drive motor in another direction to move said associated webbing to a normal release position, and (3) interruption of the operation of said drive motor;
second switching means, responsive to a plurality of indicating devices conditionally indicative of one of a plurality of requirements including (1) the need to move said associated webbing to said normal fastened position, (2) the need to move said associated webbing to said normal release position, and (3) the need to stop movement of said associated webbing, for controllably supplying current to said first switching means, said second switching means being operative to supply current in response to said requirements (1) and (2) and operative to block current in response to said requirement (3), and a predetermined one of said conditions being established in response to the operative state of said second switching means and in accordance with the indicated one of said requirements;
timing means for indicating that the length of operation of said drive motor exceeds a predetermined period of time, said second switching means being responsive thereto to block current, thereby overriding the function of said indicating devices; and manual operation means for overriding the function of said timing means, thereby reestablishing the function of said indicating devices.

10. The circuit of claim 9 further comprising alarm means operative when a propulsion system of said vehicle is actuated for alerting an operator of the presence of said requirement (1).

11. The circuit of claim 10 further comprising means for detecting the release of a web restraining mechanism, said alarm means further being responsive to said release detecting means.

12. A control circuit for a passive seatbelt system of a vehicle, said passive seatbelt system including at least one webbing, each webbing being associated with an occupant of said vehicle, for restraining said occupant in an emergency situation; a webbing drive motor associated with each webbing for moving the associated webbing into one of two positions, said positions being a fastened position and a released position; and a switching system for indicating which one of a plurality of situations characterizes each of said at least one webbing, said situations being (1) secured in said fastened position, (2) secured in said released position, (3) movement required toward said fastened position, and (4) movement required toward said released position; said control circuit comprising:

a current switching circuit;

a biasing circuit coupled to said current switching circuit and responsive to said switching system for turning ON said current switching circuit when either of said situations (3) and (4) occur in the characterization of any of said at least one webbing, and for turning OFF said current switching circuit when neither of said situations (3) and (4) occur in the characterization of all of said at least one webbing; and a relay circuit having respective portions coupled to each drive motor, each respective portion being responsive to said switching system, when said current switching circuit is in an ON condition, for supplying current in one direction to the associated drive motor in response to said situation (3); for supplying current in another direction to the associated drive motor in response to said situation (4); and for removing current from the associated drive motor in response to said situations (1) and (2);

a timing circuit coupled to said current switching circuit and effective when said current switching circuit is ON for a predetermined period of time for turning OFF said current switching circuit to prevent the at least one drive motor from burning out; and a manual switch for forcibly turning ON said current switching circuit and thereby overriding the OFF condition induced by said timing circuit.

13. The control circuit of claim 12 further comprising an alert circuit including a warning device and at least one release indicating switch, each being associated with one webbing; said alert circuit being responsive, when a propulsion system of said vehicle is actuated, to one or more occurrences, said occurrences including the manual release of the restraining function of said webbing as indicated by any of said at least one release indicating switch and the presence of said situation (3), for indicating a failure of the restraining function of a webbing.

* * * * *